(12) United States Patent
Bailey et al.

(10) Patent No.: US 7,658,079 B2
(45) Date of Patent: Feb. 9, 2010

(54) COOLING SYSTEM AND METHOD

(76) Inventors: Peter F. Bailey, 982 Sherman Hollow Rd., Huntington, VT (US) 05462; Walter C. Joncas, 4701 Ridge Rd., Tazenovia, NY (US) 13055; Gregory W. Dodge, 533 Boston Rd., Billerica, MA (US) 01821

(*) Notice: Subject to any disclaimer, the term of this patent is extended or adjusted under 35 U.S.C. 154(b) by 262 days.

(21) Appl. No.: 11/562,805

(22) Filed: Nov. 22, 2006

(65) Prior Publication Data

US 2008/0115515 A1    May 22, 2008

(51) Int. Cl.
  *F25B 17/00* (2006.01)
  *F25B 41/00* (2006.01)
  *F25B 49/00* (2006.01)
(52) U.S. Cl. .................. 62/181; 62/183; 62/196.3; 62/228.1; 62/DIG. 22
(58) Field of Classification Search .............. 62/181, 62/183, 196.1, 196.3, 197, 228.1, DIG. 22
See application file for complete search history.

(56) References Cited

U.S. PATENT DOCUMENTS

| | | | | | |
|---|---|---|---|---|---|
| 3,815,378 | A | * | 6/1974 | Hoenisch | 62/184 |
| 5,168,715 | A | * | 12/1992 | Nakao et al. | 62/181 |
| 6,023,935 | A | * | 2/2000 | Okazaki et al. | 62/119 |
| 6,871,509 | B2 | * | 3/2005 | Grabon et al. | 62/201 |
| 7,003,968 | B2 | * | 2/2006 | Ben Yahia | 62/183 |

* cited by examiner

*Primary Examiner*—Marc E Norman
(74) *Attorney, Agent, or Firm*—Joseph S. Heino; Patrick M. Bergin

(57) ABSTRACT

The present invention related to cooling systems. More specifically, the present invention relates to a system for cooling one or more parts of a building and or processes comprising a compressor, a condenser having an inlet and an outlet and a plurality of condenser cooling fans, a receiver, a liquid refrigerant pump, an expansion device, an evaporator, the evaporator being surrounded by a chiller barrel having a cooled water return and a chilled water supply line, and refrigerant line means interconnecting the compressor, condenser, expansion device and evaporator in series, in a closed loop for circulating refrigerant therethrough; means for switching the cooling system between free cooling and mechanical cooling and means for actively floating the head pressure in both mechanical and free cooling modes.

8 Claims, 4 Drawing Sheets

COOLING SYSTEM AND METHOD

FIELD OF THE INVENTION

The present invention relates generally to cooling systems and methods. More specifically, the present invention relates to a system and method for the active and passive cooling of buildings or certain processes that are located in cooler climates with high heat loads.

BACKGROUND OF THE INVENTION

Vapor compression refrigeration systems are well known in the art. Vapor compression systems circulate refrigerant to achieve a desired cooling effect. Starting with the evaporator, which is where the desired cooling effect is achieved, refrigerant evaporates, thereby carrying away the latent heat of vaporization, as it passes through the evaporator. The evaporator serves as a heat exchanger. Air, water, glycol or other cooling mediums, which are hereinafter referred to interchangeably as "water" or "secondary fluids," forced over the surface of the evaporator are cooled. At the same time, the evaporator surface is warmed, thereby continuing the vaporization of the refrigerant.

Refrigerant leaving the evaporator is in a low pressure gas state. This low pressure refrigerant is then compressed by a compressor to a hot, highly pressurized gas state and passed to yet another heat exchanger, the condenser, which is normally outside, or a distance away from, the object or building being cooled. The condenser provides a location wherein the hot refrigerant is permitted to condense to a liquid. This results in heat transfer from the refrigerant to cooler surroundings. After passing through the condenser, the liquid refrigerant enters the expansion valve where it again expands to the evaporator pressure.

As most people are aware, air conditioning is used to cool buildings in the warm summer months. However, many buildings also require mechanical cooling during the winter months as well. This is due to high internal heat loads that are generated by processes, persons, lighting, computers and other office equipment situated within the building. Other buildings that have high internal heat loads often house factory equipment. If the building has no means to bring in outside air to cool the building, then energy intensive mechanical cooling systems must be operated.

Typical mechanical cooling systems are generally designed to run during the warmer months of the year. If a mechanical cooling system is required to operate during very cold weather, the system will often fail. Such failures normally occur at temperatures below 32 degrees Fahrenheit. In general, this failure is caused by the refrigerant having a tendency to migrate to the coldest spot in the cooling system, normally the condenser, which is located outside. As a result, the compressor starves for refrigerant and is automatically shut down on low evaporator pressure.

One way to keep the compressor running in the foregoing situation is to employ a liquid refrigerant pump after the condenser to pump liquid refrigerant to the expansion device. The use of a refrigerant pump as described will also eliminate flash gas in the outlet lines leading to the expansion valve. This permits the compressor to run at lower discharge pressures and temperatures, thereby saving energy by taking the load off the compressor. However, such methods may not be as efficient for buildings and processes that require cooling on very cold days. Therefore, what is needed is a cooling system and method that is effective on cold days and that does not require the inefficient, power intensive use of mechanical cooling.

SUMMARY OF THE INVENTION

A preferred embodiment of the system and method of the present invention provides for an extremely efficient hybrid mechanical cooling or "free" cooling, air conditioning system. The cooling system disclosed permits the floating of head pressure with mechanical cooling thereby providing substantial energy savings. The same cooling system permits free cooling, that is the compressor is bypassed and liquid refrigerant is circulated through the cooling system by a liquid refrigerant pump.

In free cooling mode, the cooling system is capable of being powered by a solar array, small wind turbine or micro hydro power source. In free cooling mode, the cooling system could optionally operate off the conventional electric grid 100% of the time.

A preferred embodiment of the present invention also provides for programmable control of the condenser fans. The cooling system may provide for the use of digital control for automatic transitions between free cooling and mechanical cooling.

Yet another feature of the cooling system is the use of automated ball valves as opposed to solenoid valves to control changeovers between free cooling and mechanical cooling. The use of ball valves reduces or eliminates instances of leak by. Additionally, solenoids have no positive closure. Ball valves also offer substantially lower pressure drops, thereby increasing the efficiency of the cooling system. Additionally, automated ball valves are capable of offering precise feedback as to position.

Another embodiment of the invention operates without the use of an expansion device in the free cooling mode.

Another embodiment of the invention provides for the use of a receiver as a liquid vapor trap following the condenser. Such a device stores liquid refrigerant downstream from the condenser, thus increasing condensing space.

A preferred embodiment of the present invention provides for a liquid refrigerant pump having a soft start mechanism to reduce the likelihood of decoupling under cold refrigerant conditions. An additional embodiment of the invention may provide for a flat plate heat exchanger between the outlet of the liquid refrigeration pump and the expansion device. The flat plate heat exchanger could potentially be attached to an external cool water source such as well water, pond, ice storage device or geothermal source.

A preferred embodiment of the present invention may employ a water cooled condenser using liquid refrigerant injection. The liquid refrigerant injection de-superheats the vapor leaving the compressor to reduce the temperature of the vapor entering the water cooled condenser. Liquid refrigerant injection can prevent the formation of scale thereby maintaining the efficiency of the heat exchanger.

The cooling system of the present invention is capable of operating in free cooling mode at temperatures as high as 60 degrees F. Additionally, a preferred embodiment of the present invention may be operable in combination with a second or multiple cooling systems. In an exemplary installation, two chillers are required for cooling in the warmer months. Both chillers may be capable of floating head pressure. In cooler weather, however, such chillers may not operate as efficiently. Such systems may shut down one chiller under certain conditions and simply run one chiller under free cooling conditions.

As indicated, the preferred embodiment of the present invention is designed to improve the efficiency of refrigeration and air conditioning systems in cool weather. The preferred embodiment also enables the aforementioned improvements in efficiency economically and by retrofitting existing systems as well as new systems.

The foregoing and other features of the system and method of the present invention will be apparent from the detailed description that follows.

DETAILED DESCRIPTION OF THE INVENTION

Figure 1:
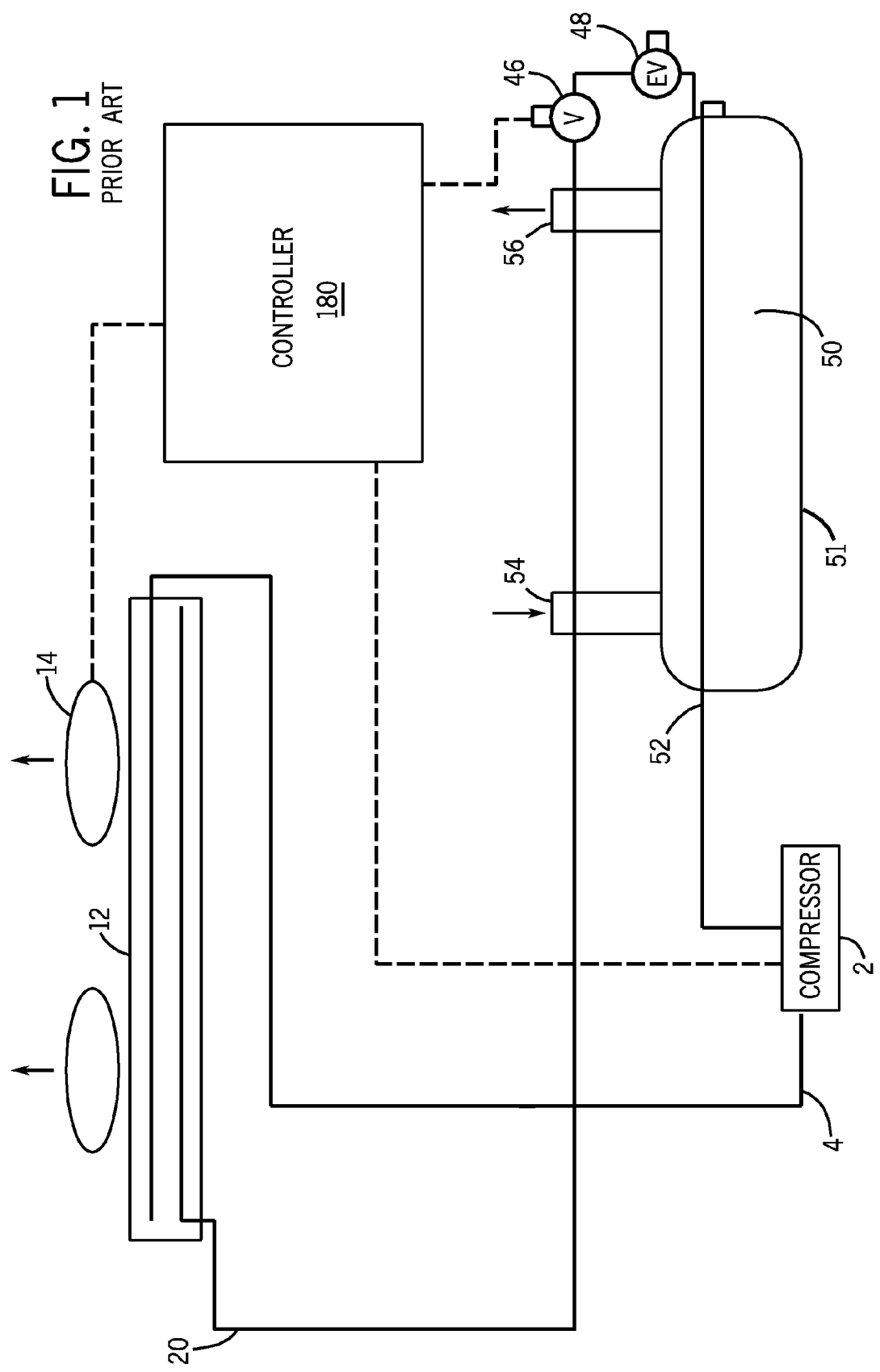
FIG. 1 is a schematic diagram of a prior art cooling system.

Referring now to FIG. 1 there is illustrated a prior art cooling system that circulates refrigerant throughout. The refrigerant may be any suitable vaporizable refrigerant. The cooling system 1 of FIG. 1 is comprised of a compressor 2. The compressor 2 compresses the refrigerant from a warm vapor state to a hot, highly pressurized state. The refrigerant is discharged along the compressor/condenser line 4. The refrigerant moves to the condenser 12, which is normally located outdoors. The condenser 12 is a heat exchanger within which the refrigerant is allowed to condense to a liquid. Condenser fans 14 are then used to draw heat away from the condenser 12. The liquid refrigerant exits the condenser 12 via the condenser/expansion device line 20, and flows through an expansion device 48 to the evaporator 50. Water, or some other suitable liquid, is circulated through the chiller barrel 51 via the chilled water return pipe 54 and the chilled water supply pipe 56. The liquid refrigerant then exits the evaporator 50 via the evaporator discharge line to the compressor 2.

Such systems are designed to run in the warmer months of the year. However, when temperatures cool, such systems often fail, as the refrigerant used tends to migrate to the coldest area of the system. Normally, during cooler months, the condenser 12 is the coldest part of the system, as it is normally located outdoors and in the elements. As a result, the compressor 2 starves for refrigerant and shuts down as a result of low suction pressure.

Figure 2:
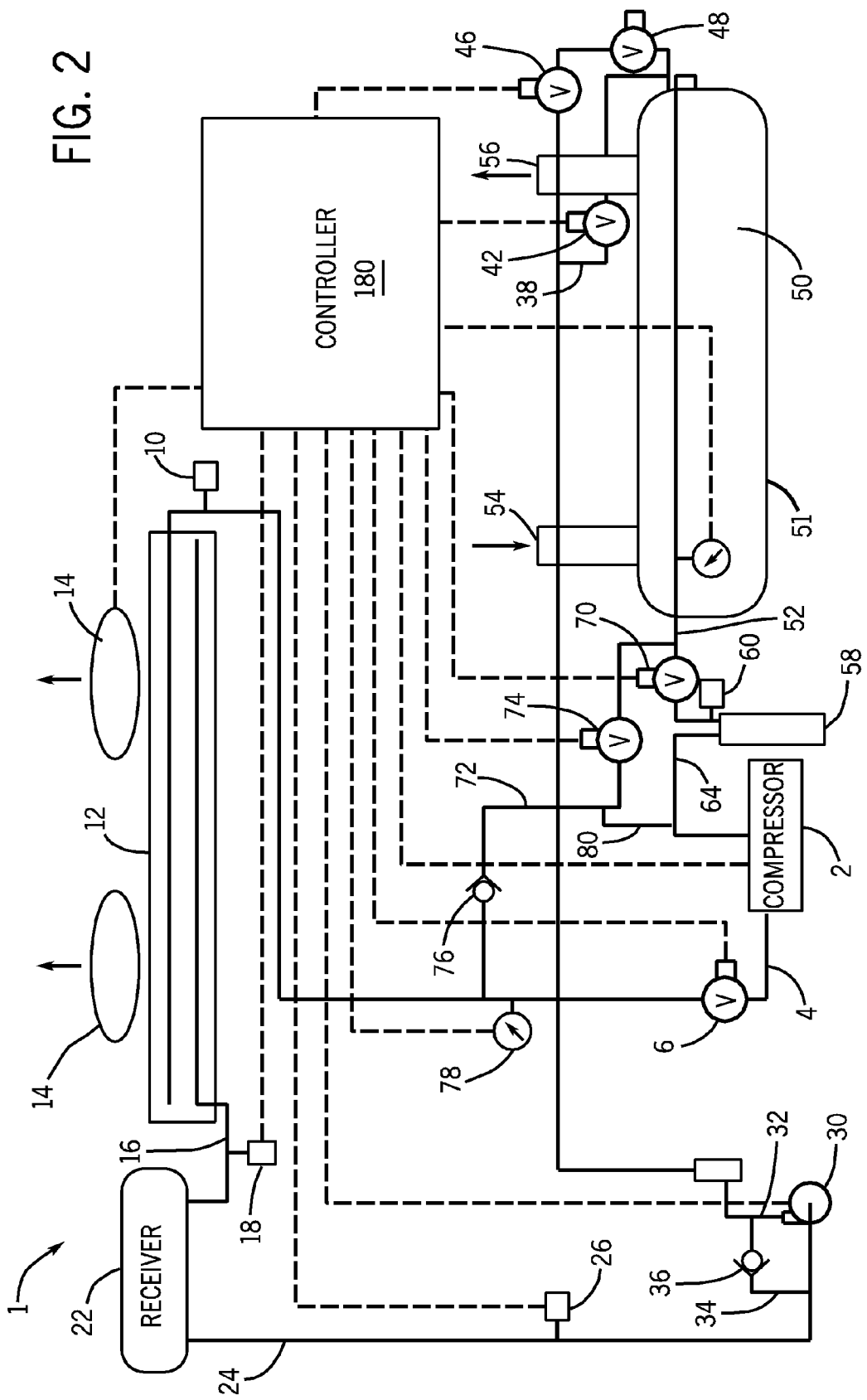
FIG. 2 is a schematic diagram of the cooling system claimed in the appended claims.
Figure 3:
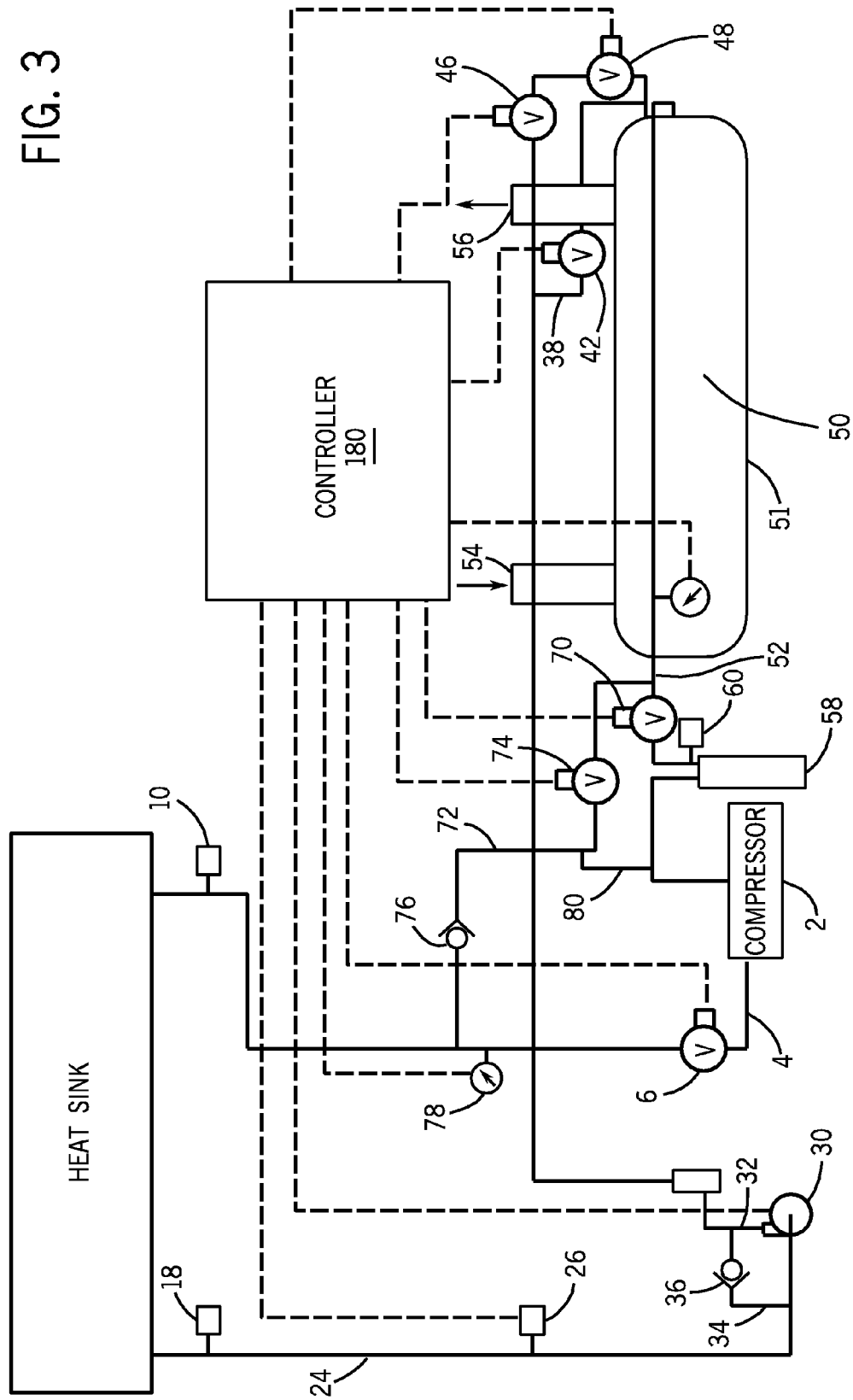
FIG. 3 is a schematic diagram of a number of potential alternative embodiments to the cooling system claimed in the appended claims.

As depicted in FIG. 2, a preferred embodiment of the cooling system provides a standard cooling cycle consisting of a closed loop system having a compressor 2, condenser 12, expansion device 48 and evaporator 50, each of the aforementioned being connected by refrigerant lines 4, 16, 24, 32, 52, 64. A preferred embodiment of the cooling system FIG. 2 further provides for a receiver 22 following the condenser 12 and a liquid refrigerant pump 30 following the receiver 22.

The receiver 22 is generally situated lower than the outlet of the condenser 12, which creates a refrigerant vapor trap. This serves a number of purposes. First, the receiver 22 prevents vapor from reaching the liquid refrigerant pump 30, which is not designed to be a vapor pump. Second, the receiver 22 eliminates the need for a critical charge of refrigerant. Third, the receiver 22 permits the flow of refrigerant out of the condenser 12, thereby freeing up space within the condenser 12.

Liquid refrigerant leaving the receiver 22 travels to the liquid refrigerant pump 30 via the receiver/liquid refrigerant pump line 24. Between the receiver 22 and the liquid refrigerant pump 30 is a liquid level sensor 26. If no liquid refrigerant is detected, the liquid level sensor 26 sends a signal to a pre-programmed controller 180 which is capable of deactivating the liquid refrigerant pump 30. In the event that no liquid refrigerant is detected for a set period of time, a leak condition is assumed and the controller 180 activates an alarm. The speed of the liquid refrigerant pump 30 is adjustable via preprogramming of the controller 180 such that the refrigerant flow can be varied.

The cooling system FIG. 2 employs a liquid refrigerant pump 30 that is used to pump liquid refrigerant between the condenser 12 and the evaporator 50. When the compressor 2 runs, this allows the compressor 2 to run at lower temperatures and pressures. A subject which will be discussed in more detail later. The refrigerant pump 30 used with the present invention employs a magnetic driven impeller pump. Magnetic drive pumps are seal-less pumps that use a coaxial magnetic coupling to transmit torque to an impeller. An electric motor drives a set of permanent magnets that are mounted on a carrier or drive assembly. In turn, the magnets drive the inner rotor and provide the no-slip or synchronous capability of the torque coupling. The refrigerant pump 30 also employs a soft start sequence to avoid decoupling between the magnet and the impeller.

In the event that the electric motor or the liquid refrigerant pump 30 fails, a preferred embodiment of the present invention provides for a bypass loop 34 around the liquid refrigerant pump 30. The bypass loop 34 contains a differential check valve 36. The liquid refrigerant pump 30 pumps refrigerant to the expansion device 48 via liquid refrigerant/expansion device line 32.

A preferred embodiment of the present invention employs a ball valve 46 in series with the expansion valve 48. Additionally, a preferred embodiment provides for a bypass loop 38 around the expansion valve 48. Each of the ball valves 42, 46 has feed-back capabilities for reporting position and sequence to the controller 180.

In some circumstances, it may be advantageous to bypass the expansion device 48 via the expansion device bypass line 38. In that case, the mechanical ball valve 42 is "open." In the event the expansion device is in use, e.g. when the compressor 2 is running, the ball valve 42 on the expansion device bypass line 38 is "closed" and the ball valve 46 preceding the expansion device 48 is "open." Refrigerant passing through either the expansion device 48 line or the expansion device bypass line 38 enter the evaporator 50. The evaporator 50 is surrounded by the chiller barrel 51. Water from the chilled water return line 54 circulates through the chiller barrel 51 and returns to the object being cooled via the chilled water supply line 56. Heat exchange between the cold refrigerant and the secondary fluid (as mentioned above, air, water, liquid refrigerant, glycol, citrus based cooling fluids or other cooling mediums, are hereinafter referred to interchangeably as "water" or "secondary fluids,") in the chiller barrel 51 cools the water in the chiller barrel 51. Obviously, if the secondary fluid is air, the physical structure of a chiller barrel 51 is not required.

Refrigerant exiting the evaporator 50 via the evaporator/accumulator line 52 enters the accumulator 58. A preferred embodiment of the cooling system FIG. 2 employs a suction line accumulator 58 to capture any liquid refrigerant not evaporated in the evaporator 50 ahead of the compressor 2. The preferred embodiment of the cooling system FIG. 2 also includes a liquid refrigerant sensor 60 on the evaporator/accumulator line 52. The liquid refrigerant sensor 60 is in electronic contact with the controller 180. If liquid refrigerant is sensed, the controller 180 will not permit the compressor 2 to start.

The compressor 2 is effectively isolated using three ball valves 70, 74, 6. The suction line accumulator ball valve 70 is located on the evaporator/accumulator line 52. The compressor discharge ball valve 6 is located downstream of the compressor 2. The compressor bypass ball valve 74 is located on the compressor bypass line 72. Each of the three ball valves 70, 74, 6 have feedback capability and provide position feedback to the controller 180. If any of the ball valves 70, 74, 6 are out of position, the controller 180 will not start the compressor 2. The compressor bypass line 72 also has a check valve 76 to prevent hot, compressed refrigerant from flowing back through the compressor bypass line 72. Line 80 is used to vent crankcase vapor.

When mechanical cooling is not required, i.e., when the compressor 2 is off, the controller 180 shuts off a compressor crankcase heater (not shown) to save energy. When the controller 180 determines that mechanical cooling may be required, the controller 180 turns on the crankcase heater well in advance of the compressor start sequence.

A preferred method of operation for free cooling is that when the glycol chilled water temperature in the chiller barrel 51 increases above an adjustable predetermined point, e.g. 45 degrees F., and the outside temperature is below an adjustable predetermined point, e.g. 40 degrees F., and it is one of a predetermined set of cooler months, the cooling system FIG. 2 will automatically switch to free cooling mode. However, before energizing the free cooling loop, the controller 180 identifies whether the chilled water pumps are on, whether the chiller is active and whether the building is occupied.

If these conditions are met, the controller 180 will isolate the compressor 2 by closing the compressor suction line ball valve 70 and the compressor discharge line ball valve 6 and opening the ball valve 74 on the compressor bypass line 72. The controller 180 also directs the expansion line ball valve 46 to close, thereby closing off the expansion device 48. Refrigerant bypasses the expansion device 48 and enters the evaporator 50 inside the chiller barrel 51 where the refrigerant picks up heat from the circulating glycol chilled water from the building. The refrigerant, being in a mixed vapor and liquid state, enters the evaporator/accumulator line 52 and then the compressor bypass line 72. The refrigerant then bypasses the compressor 2 and moves directly to the condenser 12, where it cools as it gives up heat to the outside air, geothermal source, pond, well or ice storage unit. Each of the above-referenced ball valves 6, 70, 74, 42, 46 is equipped with a circuit or controller that communicates the physical position of the valves 6, 70, 74, 42, 46 to the controller 180.

Once the position of each ball valve 6, 70, 74, 42, 46 has been verified, a liquid level sensor 26 verifies that there is sufficient liquid refrigerant in the receiver/refrigerant pump line 24 before the frequency drive or soft start means for the liquid refrigerant pump 30 is energized. The liquid refrigerant pump 30 is then slowly ramped up to operating speed. Some embodiments of the invention may include additional means for protecting the liquid refrigerant pump 30 from starvation. For example, a flow sensor could be positioned either upstream or downstream from the liquid refrigerant pump 30, or both. Additionally, a pressure sensor could be used upstream and/or downstream from the liquid refrigerant pump 30.

A temperature sensor 10 is located on the compressor/condenser line 4. Another temperature sensor 18 is located on the condenser/receiver line 16. Each of the temperature sensors 10, 18 is in electronic communication with the controller 180 as well. The controller 180 follows a pre-programmed algorithm to determine the speed at which to set the condenser fans 14. The refrigerant temperature is normally set at a specific temperature, e.g. 30 degrees F. and is maintained by the controller 180. As the refrigerant increases or decreases in temperature, the controller 180 responds by increasing or decreasing the speed of the condenser fans 14. If and when the chilled water leaving the chiller barrel 51 reaches a certain desired set-point temperature, the liquid refrigerant pump 30 and the condenser fans 14 are shut off. When the chilled water temperature leaving the chiller barrel 51 reaches a desired set-point temperature, e.g. 45 degrees F., the liquid refrigerant pump 30 and condenser fans 14 are reactivated.

When required, the same cooling system can be reconfigured for mechanical cooling. When the glycol chilled water temperature increases above an adjustable set point, e.g. 45 degree F., and the outside air rises above an adjustable set point, e.g. 40 degrees F., and it is one of the warmer months of the year, the system switches to mechanical cooling. Before mechanical cooling can begin, the controller 180 will determine whether the chilled water pumps are on and that the building is in the occupied mode. At the same time, the controller 180 will determine by the liquid sensor 60 whether any liquid is present in line 64 before the compressor 2 is permitted to start.

As part of the changeover to mechanical cooling, the system first purges refrigerant, i.e., the glycol chilled water is permitted to boil off refrigerant in the evaporator 50 and second, turns on the compressor crank case heater. Normally, the refrigerant is simply given an adjustable predetermined amount of time to boil off. The condenser fans 14 are then started, thereby cooling the refrigerant in the condenser 12 and causing condensation of refrigerant, which reduces pressure in the condenser 12 and draws refrigerant to the condenser 12.

After the purge cycle is completed, the controller 180 directs the ball valve 70 on the evaporator/accumulator line 52 to open, the ball valve 6 on the compressor/discharge condenser line 4 to open and the ball valve 74 on the compressor bypass line 72 to close. Additionally, the ball valve 42 on the evaporator bypass line 38 is closed. As discussed earlier, each ball valve 6, 42, 46, 70, 74 has positioning feedback capability to the controller 180 such that the controller 180 can verify whether the valves 6, 42, 46, 70, 74 are in the open position before the compressor 2 starts.

When the compressor 2 cycles on, the liquid refrigerant pump 30 is started after an adjustable time delay of, e.g. 30 seconds. Once the liquid refrigerant pump 30 is operating, the head pressure will be allowed to float downwardly to an adjustable set point, e.g. 120 p.s.i.g. While the compressor 2 is running, a pressure sensor 78 on the compressor/condenser line 4 is used to regulate condenser fans 14 speed. When head pressure increases, the speed of the condenser fan 14 will be increased.

If and when the chilled water temperature leaving the evaporator reaches set point temperature, the compressor 2, liquid refrigerant pump 30 and condenser fans 14 will shut off. As the chilled water reaches a predetermined set point as recognized by the controller 180, the compressor 2, liquid refrigerant pump 30 and condenser fans 14 will restart.

Figure 4:
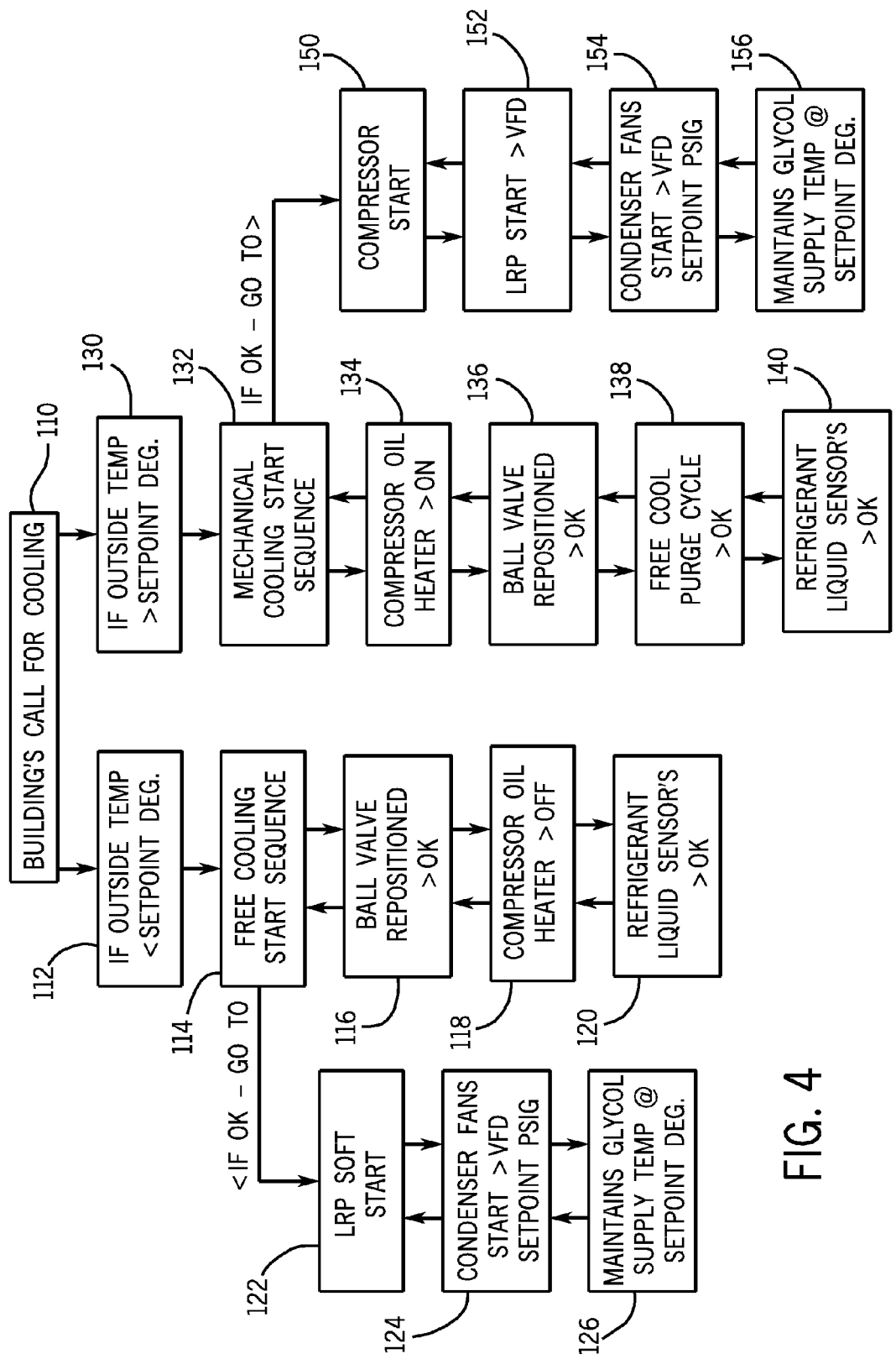
FIG. 4 shows a flow chart detailing the control logic followed by the cooling system controller used with the system and method of the present invention.

Shown in FIG. 4 is a diagram of the ladder logic employed in controlling and exemplary embodiment of the claimed invention. As has been discussed, the building is continually monitored to determine whether there is a demand for cooling 110. If there is a demand for cooling 110 and if the outside temperature is less than a set point temperature 112, the controller 100 can start the free cooling sequence 114. The free cooling sequence requires a check of the position of each ball valve 116, verification that the compressor crankcase heater 118 is turned off and verification that liquid refrigerant is present in the accumulator/refrigerant pump line 120. If each of the above steps checks out, the liquid refrigerant pump 30 is started 122, the condenser fans 14 are started 124 and the glycol supply temperature is monitored to maintain a desired setpoint temperature 126.

Alternatively, if the building has cooling demand 110 and the outside temperature is greater than the specified setpoint temperature 130, the mechanical cooling sequence start sequence begins 132. The mechanical cooling start sequence 132 turns on the compressor crankcase heater 134, verifies the position of each ball valve 136, verifies that there is no potential for liquid refrigerant to enter the compressor 140. Free cool purge cycle must report OK 138. In the event each of the steps checks out, the compressor is started 150, the liquid refrigerant pump 152 is started, the condenser fans are started 154 and the glycol temperature is monitored to maintain a desired setpoint temperature 156.

In an exemplary embodiment, a 60 ton chiller that could consume as much as 60 kilowatts to cool a building may be modified in the above-described manner to now only consume between 1 and 3 kilowatts. At the warmest effective outside ambient temperature, i.e. 40 degrees F., the "free" cooling circuit can produce 22 tons of cooling capacity using less than 3 kilowatts. During colder days, this number can exceed 40 tons for 3 kilowatts or less total power input.

Having described and illustrated the foregoing cooling system in detail, it should be apparent that the invention can be modified in arrangement and detail without departing from principles thereof.

What is claimed is:

1. A system for cooling one or more parts of a building or processes comprising:
    a compressor, a condenser having an inlet and an outlet and a plurality of condenser cooling fans, a receiver, a liquid refrigerant pump, an expansion device, an evaporator, the evaporator being surrounded by a chiller barrel having a cooled water return and a chilled water supply line, and refrigerant line means interconnecting the compressor, condenser, expansion device and evaporator in series, in a closed loop for circulating refrigerant therethrough;
    a compressor input line ball valve and a compressor discharge line ball valve;
    a compressor bypass line for the refrigerant to bypass the compressor input line ball valve, the compressor and the compressor discharge line ball valve, the compressor bypass line having a compressor bypass line ball valve;
    an expansion device ball valve preceding the expansion device;
    a expansion device bypass line for the refrigerant to bypass the expansion device and the expansion device ball valve, the expansion device bypass line having an expansion device bypass ball valve;
    a compressor crank case heater;
    a controller in electronic communication with the ball valves, the controller being capable of switching between free cooling and mechanical cooling modes when desired and floating the head pressure during mechanical cooling modes, the controller also being capable of varying the flow of liquid refrigerant in the free cooling mode;
    wherein the controller is capable of switching to mechanical cooling, when required, via electronic communication to turn on the compressor crankcase heater, close the expansion device bypass ball valve; open the expansion device line ball valve; start the condenser fans; wait an adjustable predetermined time for refrigerant in the evaporator to boil off; open the compressor input ball valve and the compressor discharge ball valve; close the compressor bypass ball valve; start the compressor; wait an adjustable predetermined time; and soft start the liquid refrigerant pump.

2. The cooling system of claim 1 further comprising a condenser inlet refrigerant temperature sensor at the condenser inlet and a condenser outlet temperature sensor at the condenser outlet in electronic communication with the controller.

3. The cooling system of claim 2 wherein the controller monitors the condenser inlet temperature and the condenser outlet temperature and is capable of varying the speed of the condenser fans to maintain a specific condenser output temperature.

4. The cooling system of claim 3 further comprising a compressor discharge pressure measuring device for measuring head pressure the pressure measuring device being in electronic communication with the controller.

5. The cooling system of claim 4 wherein when the controller switches to free cooling mode, the controller sends a signal to turn off the compressor crank case heater, close the compressor input line ball valve, close the compressor discharge line ball valve, open the compressor bypass line ball valve, open the expansion device bypass ball valve, close the expansion device line ball valve and soft start the liquid refrigerant pump.

6. The cooling system of claim 4 wherein the controller is capable of monitoring the compressor discharge pressure measuring device to maintain the desired head pressure by adjusting the speed of the condenser fans.

7. The cooling system of claim 1 wherein the controller is capable of deactivating the liquid refrigerant pump and the condensing fans when the chilled water supply temperature reaches a predetermined set point.

8. A system for cooling one or more parts of a building or processes comprising:
    a compressor, a condenser having an inlet and an outlet and a plurality of condenser cooling fans, a receiver, a liquid refrigerant pump, an expansion device, an evaporator, and refrigerant line means interconnecting the compressor, condenser, expansion device and evaporator in series, in a closed loop for circulating refrigerant therethrough;
    a compressor input line ball valve and a compressor discharge line ball valve;
    a compressor bypass line for the refrigerant to bypass the compressor input line ball valve, the compressor and the compressor discharge line ball valve, the compressor bypass line having a compressor bypass line ball valve;
    an expansion device ball valve preceding the expansion device;
    a expansion device bypass line for the refrigerant to bypass the expansion device and the expansion device ball valve, the expansion device bypass line having an expansion device bypass ball valve;
    a compressor crank case heater;
    a controller in electronic communication with the ball valves, the controller being capable of switching between free cooling and mechanical cooling modes when desired and floating the head pressure during mechanical cooling modes, the controller also being capable of varying the flow of liquid refrigerant in the free cooling mode;

wherein the controller is capable of switching to mechanical cooling, when required, via electronic communication to turn on the compressor crankcase heater, close the expansion device bypass ball valve; open the expansion device line ball valve; start the condenser fans; wait an adjustable predetermined time for refrigerant in the evaporator to boil off; open the compressor input ball valve and the compressor discharge ball valve; close the compressor bypass ball valve; start the compressor; wait an adjustable predetermined time; and soft start the liquid refrigerant pump.

* * * * *